Feb. 2, 1971    F. R. LOFTHOUSE    3,559,502
PENDULUM DAMPER
Filed July 24, 1969
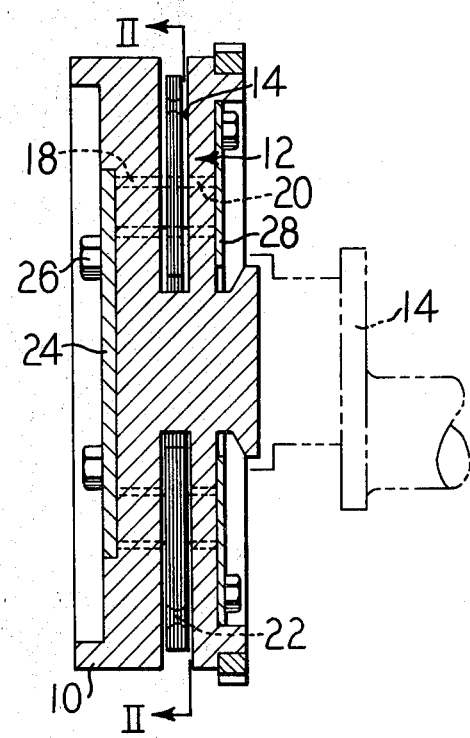
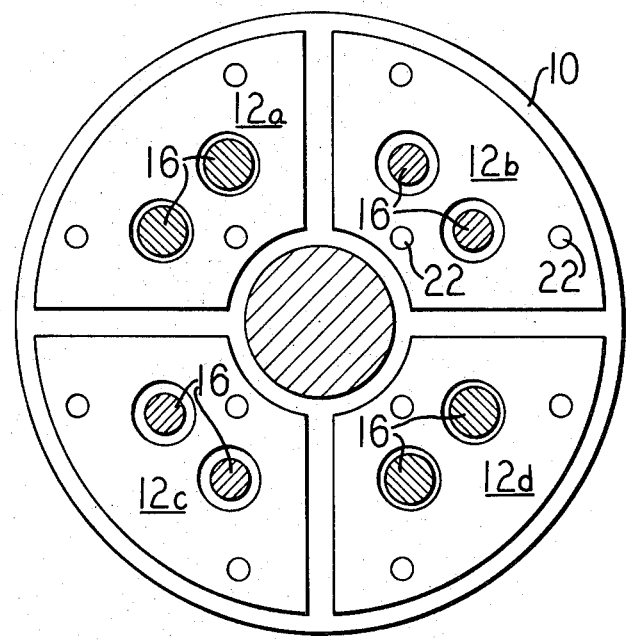
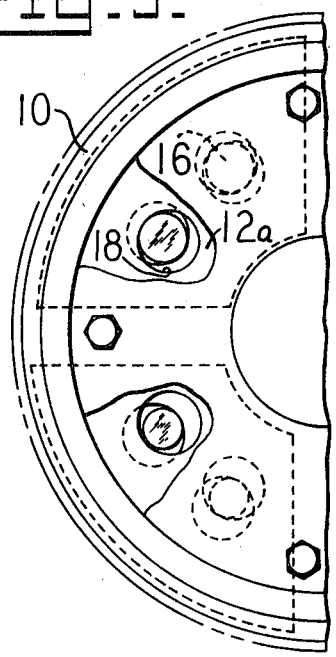
INVENTOR
FRED R. LOFTHOUSE
BY
ATTORNEYS

United States Patent Office 3,559,502
Patented Feb. 2, 1971

---

3,559,502
PENDULUM DAMPER
Fred R. Lofthouse, Pekin, Ill., assignor to Caterpillar Tractor Co., Peoria, Ill., a corporation of California
Filed July 24, 1969, Ser. No. 844,328
Int. Cl. F16f *15/10*
U.S. Cl. 74—574   4 Claims

ABSTRACT OF THE DISCLOSURE

A pendulum damper in which the pendulum elements are made of separate modules or plates laminated in numbers required to produce a desired weight and damping effect and so constructed that the roller upon which the pendulums oscillate are readily interchangeable to provide a damper of similar basic design and size which might be tuned for various order of cyclic excitation.

---

Pendelum dampers are well suited to controlling torsional vibration in internal combustion engines but are most often limited in design to control one order only of cyclic excitation. Since engines of generally similar size and design can be so varied in speeds and outputs as they are manufactured for different purposes, it is necessary to manufacture a different damper for each engine style. The present invention provides a damper which might be used for many different engines of basically similar design but having different damper requirements. This is accomplished by a design which admits of readily changing the weight of the damper pendulums by utilization of more or less of identical modules and by the utilization of a design which permits ready variation of the size of the cylindrical rollers which are employed with the pendulums.

The invention will be more readily understood from the following specification wherein reference is made to the accompanying drawing.

In the drawing:

FIG. 1 is a central transverse section through a damper embodying the present invention;

FIG. 2 is a sectional view of the damper taken along the line II—II of FIG. 1 illustrating the pendulums and supporting rollers therefor in a neutral position which they might assume if the damper were disposed in a horizontal position; and FIG. 3 is a fragmentary view with parts broken away to illustrate the relative positions of the pendulums and rollers when the damper carrier is rotating.

Referring first to FIG. 1, the damper is illustrated as contained in the flywheel of an internal combustion engine shown at 10. The flywheel acts as a carrier for pendulums generally indicated at 12 which are contained within an annular space or groove 14 in the flywheel. The flywheel is affixed, as is customary, to the end of an engine crankshaft indicated in broken lines at 14. The weights or pendulums are shown as four in number at 12a, 12b, 12c and 12d in FIG. 2 and the pendulums and flywheel are interconnected by rollers 16, there being two for each pendulum as is customary in bifilar pendulum dampers. The rollers 16 extend through aligned cylindrical cavities. Each roller extends through a cavity in a pendulum and two which are provided through the flywheel in alignment with each other as indicated in FIG. 1 at 18 and 20.

When the engine is in operation and the flywheel is rotating centrifugal force causes the pendulums to move radially outwardly until they engage the rollers 16. They continue to move outwardly until the rollers 16 come into engagement with the outer edges of the cylindrical cavities 18 and 20 in the flywheel. Thus, as shown in FIG. 3, each roller 16 is embraced between the inner edge of the pendulum cavity, as shown at 12a in FIG. 3, and the outer edge of the flywheel cavity as shown at 18. Damping is accomplished, as is very well known in connection with dampers of this type, by resistance to relative rotational movement between the carrier and the pendulums upon the occasion of torsional vibration being transferred to the damper through the rotating crankshaft. Since the rollers 16 tend, during such vibrations, to move the pendulums inwardly against the inertia force which urges them radially outwardly, the damping characteristics can be altered or turned by varying the weight of the pendulums as well as by varying the size of the rollers. Thus, in accordance with the present invention, the pendulums are made of modules in the form of flat plates or laminae as shown in FIG. 1 secured together in a single mass as by rivets as indicated at 22 and also shown in FIG. 2. Also, in accordance with the present invention, the cylindrical cavities which receive the rollers 16 are formed as though holes closed at their opposite ends by a plate 24 and cap screws 26 on one side of the plate 28 and cap screws 30 on the opposite side. Thus, assembly of the dampers is accomplished with a wide choice of pendulum weight and roller size. As illustrated in the drawing, the uppermost pendulum of FIG. 1, which would be pendulum 12b of FIG. 2, is formed of four plates while the lower most pendulum being the pendulum 12d of FIG. 2 is formed of five plates. Also the rollers as best shown in FIG. 2 are relatively small for pendulums 12b and 12c and large for pendulums 12e and 12d. Thus, the damper is illustrated as tuned to two orders of cyclic excitation. Either or both of which may be varied for different damper requirements utilizing identical stock parts throughout with exception that rollers of different diameters must be provided.

What is claimed is:

1. A pendulum damper comprising a carrier for connection to and to be rotated by an engine part subject to cyclic excitation said carrier having a circumscribing concentric annular groove, pendulums supported in said groove for oscillatory motion relative to the carrier, each said pendulum being formed of modules secured together to form a mass of desired weight.

2. The damper of claim 1 in which the modules forming the pendulums are identical flat laminae.

3. The damper of claim 1 in which the pendulum suspension is bifilar, and each pendulum is suspended by two rollers which extend through two sets of aligned cylindrical openings in the pendulum and the carrier.

4. The damper of claim 3 in which all of the said openings in the carrier are closed by a removable plate on at least one side of the carrier to permit ready interchangeability of the rollers.

References Cited

UNITED STATES PATENTS

| | | | |
|---|---|---|---|
| 1,947,052 | 2/1934 | Lack | 64—13 |
| 2,029,516 | 2/1936 | Tower | 74—574 |
| 2,306,959 | 12/1942 | Knibbe | 74—574 |
| 2,343,421 | 3/1944 | Porter | 74—574 |

FRED C. MATTERN, Jr., Primary Examiner
W. S. RATLIFF, Jr., Assistant Examiner